June 23, 1936.　　C. E. WHITEHEAD　　2,045,506
AUXILIARY WHEEL FOR AUTOMOBILES
Filed May 6, 1935
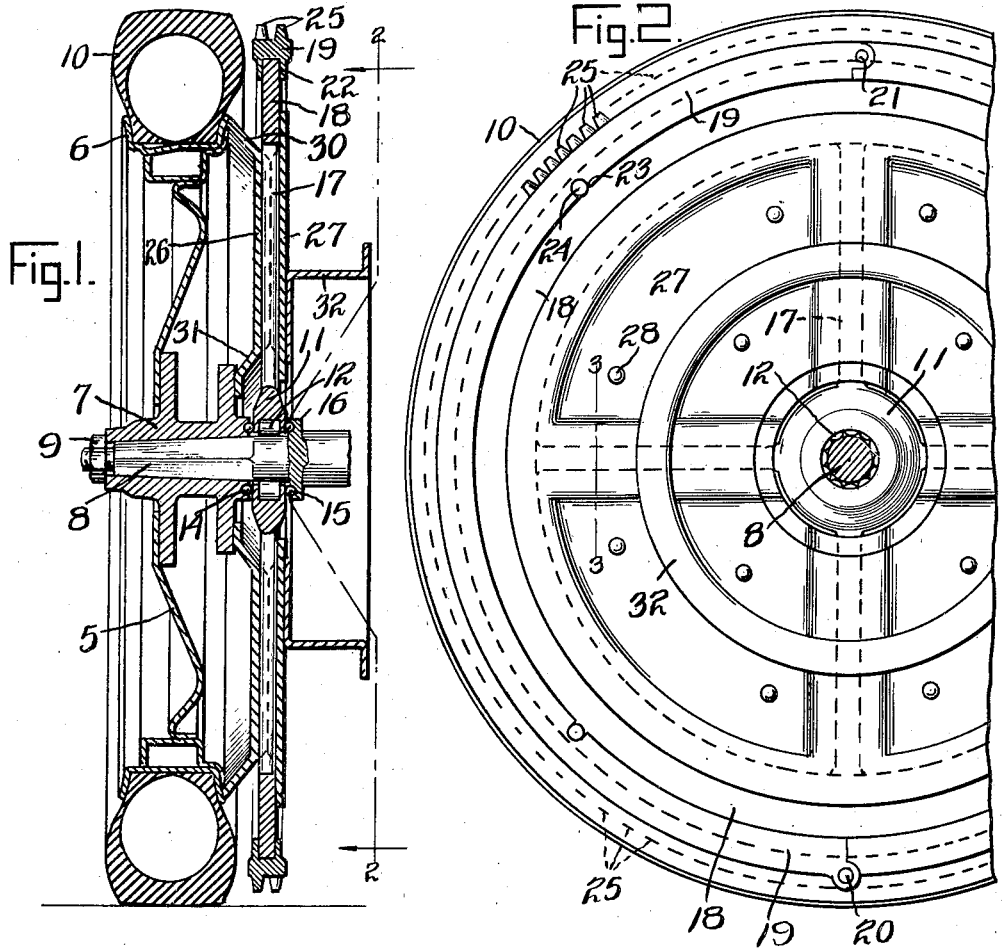
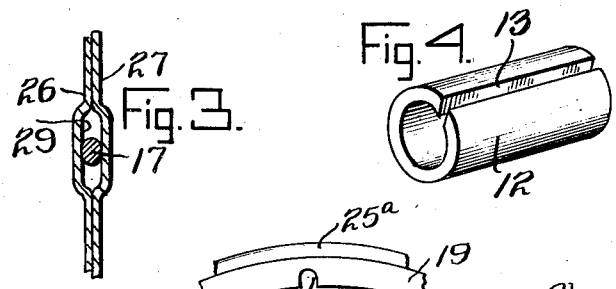
Inventor
Charles E. Whitehead
By
Attorney Patented June 23, 1936

2,045,506

UNITED STATES PATENT OFFICE 2,045,506

AUXILIARY WHEEL FOR AUTOMOBILES

Charles E. Whitehead, Pittsburgh, Pa.

Application May 6, 1935, Serial No. 20,062

2 Claims. (Cl. 301—38)

My invention relates to improvements in auxiliary wheels for motor vehicles.

An object of the invention is to provide an auxiliary wheel for automobiles, permanently mounted inwardly of and secured to each of the usual rear wheels, provided with a removable rim having a resilient tire, normally out of contact with the ground, which auxiliary wheel is adapted to function in place of the usual wheel should the tire of the latter become accidentally deflated.

A further object is to provide an auxiliary wheel of the type mentioned, to the periphery of which may be attached a rim provided with gripping lugs for use in the event of ice or snow, and which may be brought into contact with the ground upon voluntary partial deflation of the tire on the usual wheel.

Another object of the invention is to provide a device of the above-mentioned character which is simple and durable in construction, reliable and efficient in operation, and inexpensive to manufacture.

Other objects and advantages will be apparent during the course of the following description:

In the accompanying drawing, forming a part of this specification and in which like numerals are employed to designate like parts throughout the same, Figure 1 is a sectional view of a vehicle wheel with the auxiliary wheel attached thereto, Figure 2 is a section taken on the line 2—2 of Figure 1, Figure 3 is a section taken on the line 3—3 of Figure 2, and Figure 4 is a perspective view of one of the supporting roller bearings for the auxiliary wheel.

Figure 5 is a fragmentary view of a modification.

In the drawing, wherein for the purpose of illustration, I have shown a preferred embodiment of my invention, the numeral 5 denotes, generally, an automobile wheel having the usual rim 6 and hub 7 secured to the drive axle 8, on which it is held by the nut 9, threaded on the end of the axle. The rim 6 supports a pneumatic tire 10 which when inflated provides traction between the wheel and ground.

Referring more particularly to my invention, the auxiliary wheel includes a hub 11, supported on the axle 8, adjacent the inner end of the hub 7 of the main wheel 5, by a series of split roller bearings 12. The roller bearings are confined in a groove formed in the inner circumference of the hub 11 and shown more clearly in Figure 4, are split longitudinally, as at 13, to permit a slight radial movement of the hub 11 when the auxiliary wheel is in use. The auxiliary wheel is held against lateral movement on the axle by ball bearings 14 and 15, the ball bearings 14 are disposed between the inner end of the hub 7 of the main wheel and the outer end of the hub 11 of the auxiliary wheel, while the ball bearings 15 are disposed between the inner end of the hub 11 and a shoulder 16 formed on the axle 8. A plurality of spokes 17 radiate from the hub 11 in parallel relation to the sides of the main wheel and support at their outer ends a circular shaped felly 18, on the outer periphery of which is mounted a demountable rim 19. The demountable rim 19 is split at diametrically opposite points to form two halves or sections, joined together at one end by a hinge joint 20 and at their opposite ends by a separable joint 21, which permits the halves of the rim to be swung apart to place the rim around the periphery of the felly 18. The inner circumference of the rim has an annular groove 22 formed therein to receive the felly 18, one wall of the groove being provided at spaced intervals with notches 23 which engage lugs 24 projecting laterally from the felly and prevent movement of the rim with respect to the felly. The tread surface of the rim may have integral upstanding gripping lugs 25 arranged in parallel rows in staggered relation, or it may be provided with a suitable resilient tire, 25a, as shown in Figure 5.

A housing is provided for the spokes of the auxiliary wheel consisting of two disk shaped plates 26 and 27 disposed on opposite sides of the wheel and secured together by rivets 28 in face to face engagement. At points opposite the spokes, the plates are formed with opposed radial depressions or channels 29 forming relatively wide pockets to receive the spokes which permit slight movement of the spokes. The outer edge of the plate 26 is bent at an angle to form a flange 30 which is welded or otherwise suitably secured to the rim 6 of the main wheel 5 while the edge of the opening in the center of the plate is bent to form a flange 31 which is suitably fastened to the hub 7 of the main wheel. Attached to the outer face of the plate 27 is a conventional brake drum, 32.

The auxiliary wheel is attached to the main wheel 5 through the medium of the housing, so that the auxiliary wheel rotates with the main wheel which is driven by the axle 8. The outer circumference of the auxiliary wheel is such that when the pneumatic tire 10 of the main wheel is inflated the auxiliary wheel is maintained out of engagement with the ground, but upon partial or complete deflation of the tire the auxiliary wheel engages with the ground and supports the vehicle.

Normally, the auxiliary wheels each carry a rim 19 provided with a resilient tire so that, in the event of accidental deflation of the tire on one of the usual wheels, the adjacent auxiliary wheel will function.

In the event of snow or ice, a rim 19 provided with gripping lugs 25 is placed on each auxiliary wheel, after which the tires of the usual rear wheels are deflated to a sufficient degree to permit the lugs to support the vehicle and provide the necessary traction.

While the invention has been described herein as used in connection with the rear wheels of an automobile, it will be understood that it may be applied to all of the wheels if desired.

From the foregoing, it will be seen that a device has been provided whereby the dangers resulting from accidental deflation of tires will be eliminated as will those resulting from skidding.

It is to be understood that the form of my invention herewith shown and described is to be taken as a preferred example of the same and that certain changes in the shape, size, and arrangement of the parts may be made without departing from the spirit of the invention or the scope of the subjoined claims.

Having thus described my invention, I claim:

1. In combination with a vehicle wheel having an axle, a spoked auxiliary wheel rotatably mounted on the axle of said vehicle wheel, housing plates disposed on opposite sides of said auxiliary wheel and fixedly secured together, said plates having opposed channels forming pockets to receive the spokes of said auxiliary wheel, said pockets being relatively wide to permit limited movement of the spokes therein, and means connecting one of said plates to said vehicle wheel.

2. In combination with a vehicle wheel having an axle, an auxiliary wheel including a hub, split roller bearings rotatably supporting said hub on the axle of said vehicle wheel, spokes radiating from said hub, a felly supported at the outer ends of said spokes, housing plates disposed on opposite sides of said auxiliary wheel and fixedly secured together, said plates having opposed channels forming pockets to loosely receive said spokes, said pockets being sufficiently wide to permit limited movement of the spokes therein, and means securing one of said housing plates to said vehicle wheel.

CHARLES E. WHITEHEAD.